(12) United States Patent
Kiefer et al.

(10) Patent No.: US 12,013,689 B2
(45) Date of Patent: Jun. 18, 2024

(54) METHOD FOR VISUALIZING PROCESS INFORMATION DURING MANUFACTURING OF SHEET METAL WORKPIECES

(71) Applicant: TRUMPF Werkzeugmaschinen GmbH + Co. KG, Ditzingen (DE)

(72) Inventors: Manuel Kiefer, Sinsheim (DE); Korbinian Weiss, Korntal (DE); Benjamin Schwarz, Muenchingen (DE); Willi Poenitz, Leonberg (DE)

(73) Assignee: TRUMPF WERKZEUGMASCHINEN SE + CO. KG, Ditzingen (DE)

(*) Notice: Subject to any disclaimer, the term of this patent is extended or adjusted under 35 U.S.C. 154(b) by 337 days.

(21) Appl. No.: 17/231,059

(22) Filed: Apr. 15, 2021

(65) Prior Publication Data

US 2021/0232128 A1    Jul. 29, 2021

Related U.S. Application Data

(63) Continuation of application No. PCT/EP2019/075984, filed on Sep. 26, 2019.

(30) Foreign Application Priority Data

Oct. 19, 2018 (DE) ...................... 10 2018 126 059.8

(51) Int. Cl.
*G05B 19/418* (2006.01)
*B26D 5/00* (2006.01)

(52) U.S. Cl.
CPC ....... *G05B 19/41875* (2013.01); *B26D 5/007* (2013.01); *G05B 19/4183* (2013.01);
(Continued)

(58) Field of Classification Search
CPC .......... G05B 19/41875; G05B 19/4183; G05B 2219/31472; G05B 2219/32218; G05B 2219/40078; B26D 5/007; Y02P 90/02
See application file for complete search history.

(56) References Cited

U.S. PATENT DOCUMENTS

| 6,298,275 B1 | 10/2001 | Herman, Jr. |
| 2005/0220335 A1* | 10/2005 | Budd .................. G01N 21/8851 382/152 |

(Continued)

FOREIGN PATENT DOCUMENTS

| CN | 103733153 A | 4/2014 |
| CN | 103759638 A | 4/2014 |

(Continued)

*Primary Examiner* — Vincent H Tran
*Assistant Examiner* — Tyler Dean Hedrick
(74) *Attorney, Agent, or Firm* — LEYDIG, VOIT & MAYER, LTD.

(57) ABSTRACT

A method visualizes manufacturing process information during manufacturing of workpieces with a flatbed machine tool. The workpieces are output as cut material on a pallet of the flatbed machine tool, a sorting table, or a conveyor belt. Workpiece image data is provided in a control system. The image data is associated with a workpiece and is for display on a display unit. Workpiece-specific manufacturing process information is provided in the manufacturing control system, and is acquired during manufacturing of the workpieces and includes features of cutting processes. A database of illustration options is provided in the manufacturing control system, the options are associated with a specific manufacturing feature and are applicable to the workpiece image data to cause an illustration of the respective workpiece image data on the display unit. The workpiece image data is displayed on the display unit, while taking into account illustration options in the workpiece-specific manner.

13 Claims, 3 Drawing Sheets

(52) U.S. Cl.
CPC .............. *G05B 2219/31472* (2013.01); *G05B 2219/32218* (2013.01); *G05B 2219/40078* (2013.01)

(56) References Cited

U.S. PATENT DOCUMENTS

| | | | |
|---|---|---|---|
| 2007/0052795 A1* | 3/2007 | Swanger | G06T 7/155 348/92 |
| 2009/0262892 A1* | 10/2009 | Haras | A61B 6/032 378/65 |
| 2012/0029661 A1* | 2/2012 | Jones | G06F 3/0484 700/17 |
| 2013/0200051 A1* | 8/2013 | Hert | B23K 26/38 219/121.67 |
| 2014/0350708 A1 | 11/2014 | Kobayashi et al. | |
| 2017/0115656 A1 | 4/2017 | Ottnad et al. | |
| 2017/0368706 A1 | 12/2017 | Zünd et al. | |
| 2019/0243343 A1 | 8/2019 | Denecke et al. | |
| 2019/0271962 A1* | 9/2019 | Miyata | G05B 19/402 |
| 2019/0310741 A1* | 10/2019 | Ganadas | H04N 21/44218 |
| 2021/0044934 A1 | 2/2021 | Kappes et al. | |

FOREIGN PATENT DOCUMENTS

| | | |
|---|---|---|
| CN | 103862519 A | 6/2014 |
| CN | 106536128 A | 3/2017 |
| CN | 108320098 A | 7/2018 |
| DE | 102008014869 A1 | 9/2009 |
| DE | 102010041548 A1 | 3/2012 |
| DE | 102013204409 A1 | 9/2014 |
| DE | 102014204695 A1 | 9/2015 |
| DE | 102014210612 A1 | 12/2015 |
| DE | 102016120131 A1 | 4/2018 |
| DE | 102017107357 A1 | 4/2018 |
| EP | 1524063 A1 | 4/2005 |
| JP | 0234293 A | 5/1990 |
| JP | 2002331383 A | 11/2002 |
| JP | 2015124057 A | 7/2015 |
| JP | 2016022511 A | 2/2016 |
| WO | WO 2019206752 A1 | 10/2019 |

\* cited by examiner

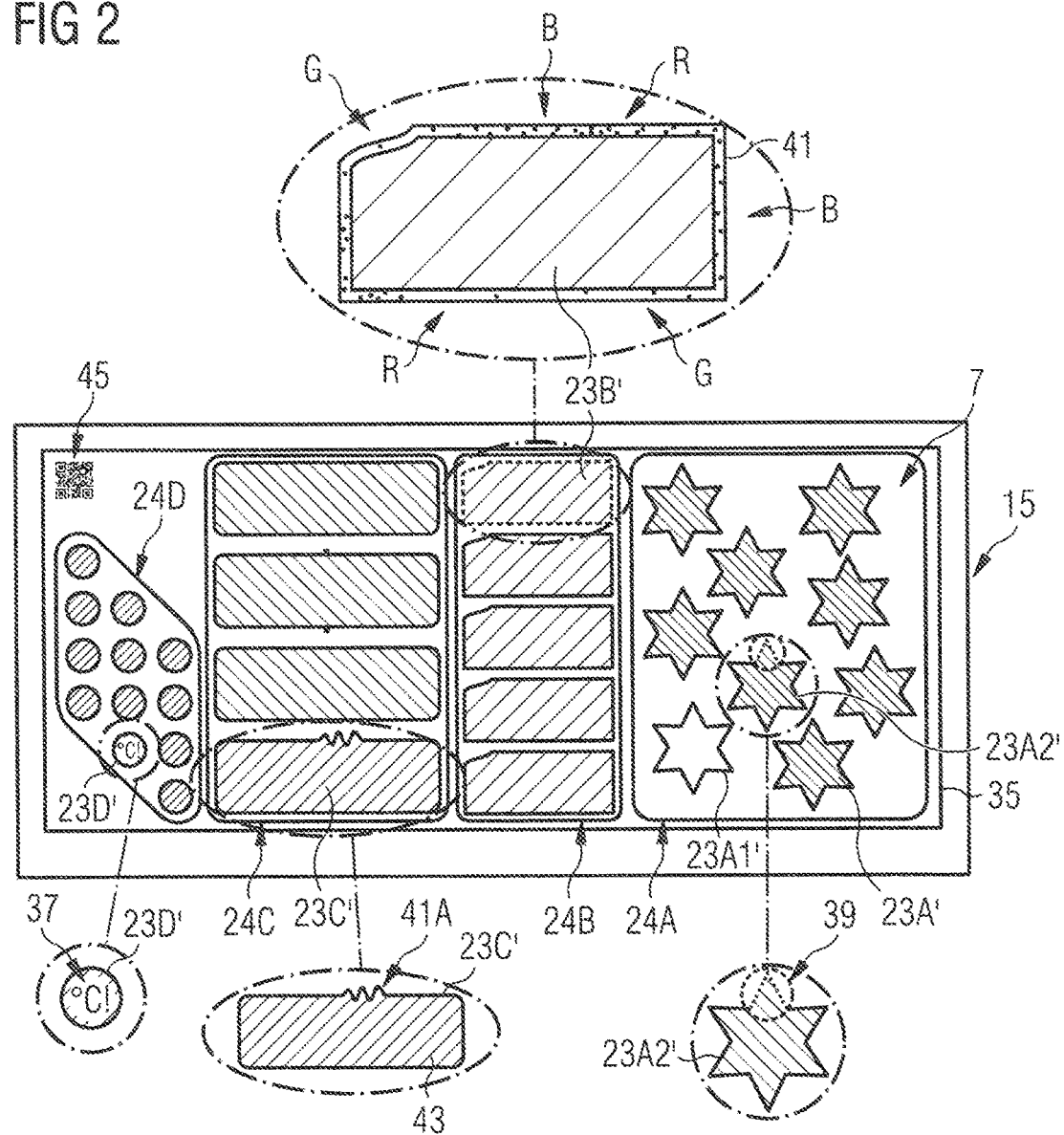

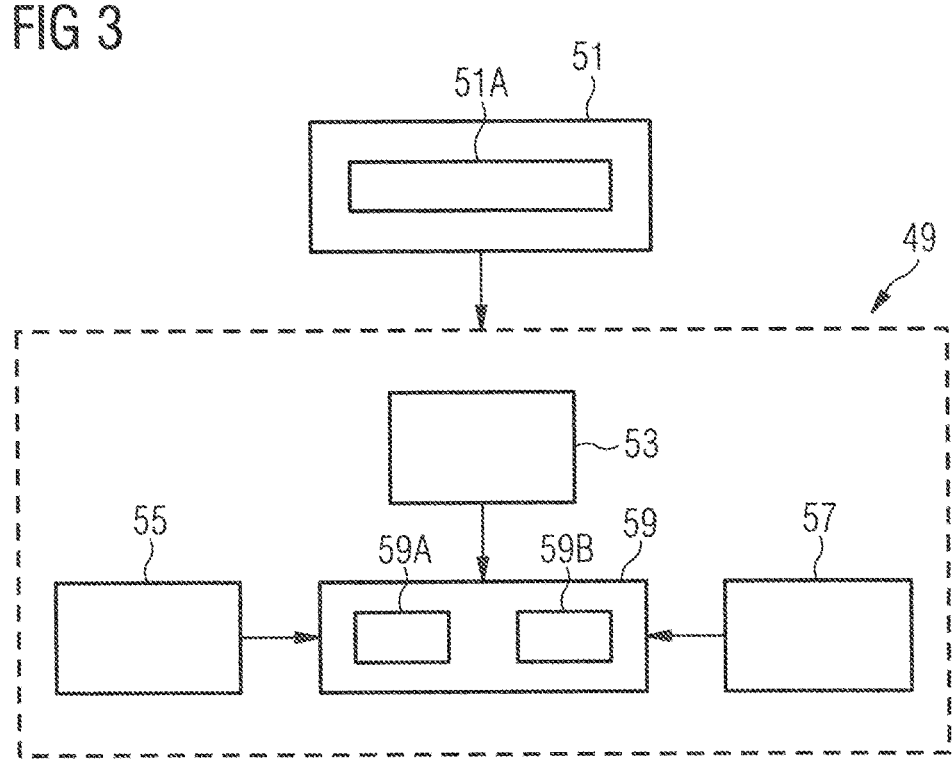

METHOD FOR VISUALIZING PROCESS INFORMATION DURING MANUFACTURING OF SHEET METAL WORKPIECES

CROSS-REFERENCE TO PRIOR APPLICATIONS

This application is a continuation of International Patent Application No. PCT/EP2019/075984, filed on Sep. 26, 2019, which claims priority to German Patent Application No. DE 10 2018 126 059.8, filed on Oct. 19, 2018. The entire disclosure of both applications is hereby incorporated by reference herein.

FIELD

The present invention relates to a method for visualizing process information during manufacturing of workpieces.

BACKGROUND

In the industrial metal and/or sheet metal processing, exemplary for the metalworking industry, many parts of different sizes and quantities are often fed to different processing steps. For example, workpieces are separated with a machine tool according to a cutting plan in different shapes and quantities from a flat material that is, for example, in a sheet form. For example, the workpieces are cut out of the flat material with a laser. Such machine tools output the processed workpieces, e.g., the laser-cut material, usually arranged next to each other, for example, on a pallet or a conveyor belt, while keeping the sheet form. From there, the workpieces are sorted and provided to further processing steps.

In sheet metal processing, camera-based support systems are used to monitor processing operations such as the aforementioned sorting process. In DE 10 2016 120 131 A1, for example, a camera-based sorting support method for a flatbed machine tool is disclosed. The disadvantage here is that the machine operator does not receive information other than the collection point for the workpieces, or receives it only in a very cumbersome way.

SUMMARY

In an embodiment, the present invention provides a method for visualizing manufacturing process information during manufacturing of workpieces with a flatbed machine tool. The workpieces are output as cut material on a pallet of the flatbed machine tool, a sorting table, or a conveyor belt. The cut material is given in a plate-shaped arrangement according to a plate-shaped starting material. Workpiece image data is provided in a manufacturing control system. The workpiece image data is associated with at least one of the workpieces of the cut material and is configured to be displayed on a display unit. Workpiece-specific manufacturing process information is provided in the manufacturing control system. The workpiece-specific manufacturing process information is acquired in a workpiece-specific manner during the manufacturing of the workpieces in the flatbed machine tool and the workpiece-specific manufacturing process information includes manufacturing features of cutting processes, which are carried out in the flatbed machine tool during manufacturing of the workpieces. A database of illustration options is provided in the manufacturing control system. The illustration options each are associated with a specific manufacturing feature, of the manufacturing features, of the workpiece-specific manufacturing process information and the illustration options are applicable to the workpiece image data to cause an illustration of the respective workpiece image data on the display unit. The illustration is set specifically for the respective manufacturing feature. The workpiece image data of the at least one of the workpieces of the cut material is displayed on the display unit, while taking into account the illustration options in the workpiece-specific manner.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following:

FIG. 2 is a sketch illustrating the illustration of information from a workpiece-specific process monitoring with workpiece data; and FIG. 3 is a flow diagram of an exemplary method for displaying workpiece images for supporting a sorting process, and/or order data during the manufacturing of workpieces.

DETAILED DESCRIPTION

Figure 1:
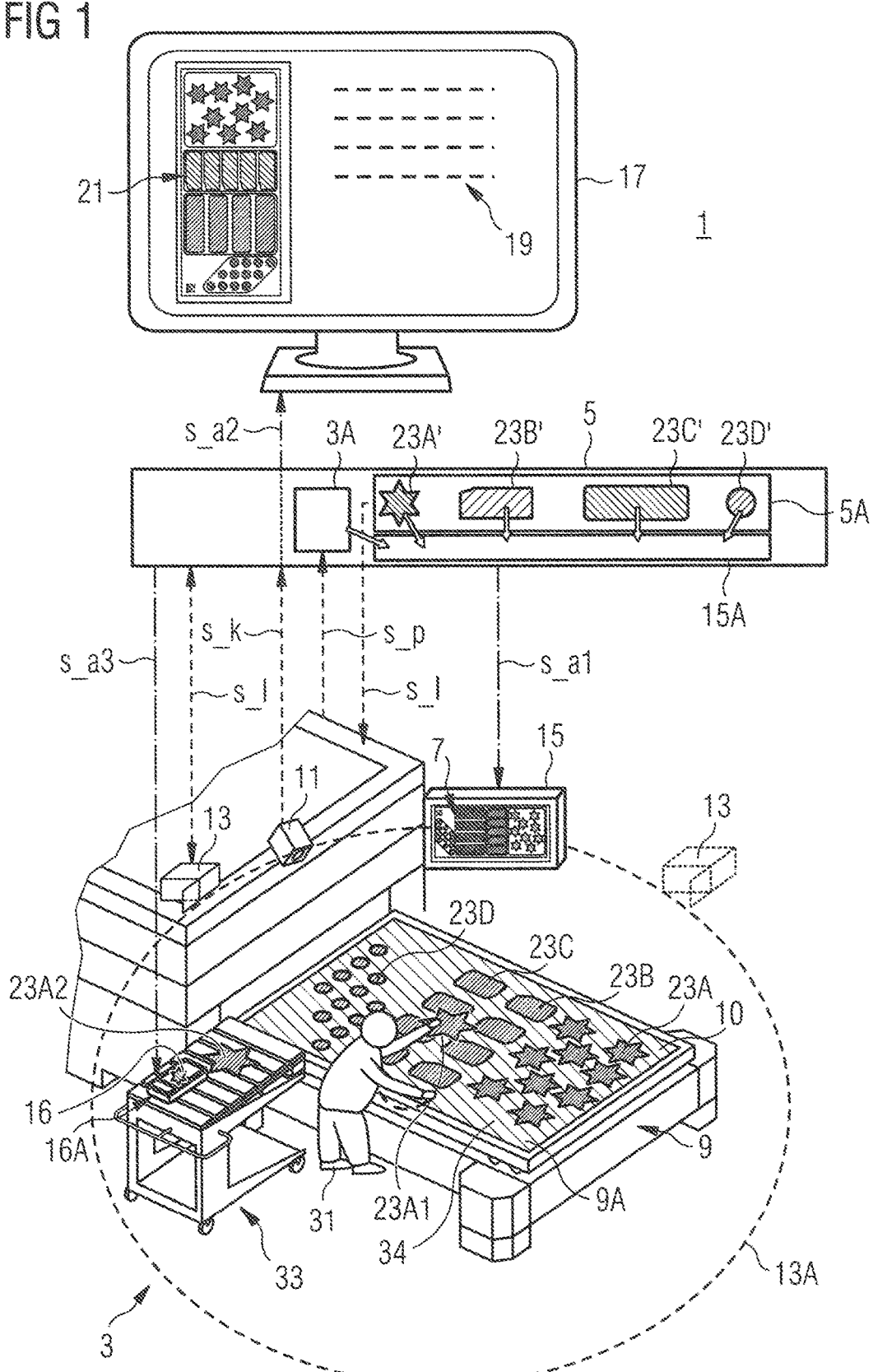
FIG. 1 is an exemplary representation of a machine tool during a sorting process.

Embodiments of the present disclosure further simplify the handling during sorting and assigning the workpieces for a machine operator, as well as make the handling more ergonomic, and enable a more targeted and faster assignment of the workpieces.

An aspect of the concepts disclosed herein relates to a method for visualizing manufacturing process information during the manufacturing of workpieces, in particular sheet metal workpieces, with a flatbed machine tool. Thereby, the workpieces are output as cut material on a pallet of the flatbed machine tool, a sorting table, or a conveyor belt. The cut material is given in a plate-shaped arrangement according to a plate-shaped starting material. The method includes the following steps:

providing workpiece image data in a manufacturing control system, wherein the workpiece image data is associated with at least one of the workpieces of the cut material and is configured to be displayed on a display unit;

providing workpiece-specific manufacturing process information in the manufacturing control system, wherein the manufacturing process information is acquired in a workpiece-specific manner during the manufacturing of the workpieces in the flatbed machine tool and the manufacturing process information includes manufacturing features of the separation processes (in particular laser cutting processes), the separation processes carried out in the flatbed machine tool during manufacturing of the workpieces;

providing a database of illustration options in the manufacturing control system, wherein the illustration options are each associated with a specific manufacturing feature of the manufacturing process information and the illustration options are applicable to the workpiece image data to cause an illustration of workpiece image data on a display unit, the illustration set specifically for a manufacturing feature; and displaying the workpiece image data of the at least one of the workpieces of the cut material on the display unit, while taking into account the illustration options in a workpiece-specific manner.

In a second aspect, a manufacturing system for manufacturing workpieces, in particular sheet metal workpieces, includes a flatbed machine tool configured to output the workpieces as cut material on a pallet of the flatbed machine tool, a sorting table, or a conveyor belt, wherein the cut material is given in a plate-shaped arrangement according to a plate-shaped starting material. The manufacturing system further includes a manufacturing control system configured to perform a method as previously described for visualizing manufacturing process information during manufacturing of workpieces with the flatbed machine tool. The manufacturing system further includes a display unit for displaying workpiece image data. The workpiece image data is associated with at least one of the workpieces of the cut material. The displaying is performed taking into account illustration options in a workpiece-specific manner, wherein the illustration options are respectively associated with a specific manufacturing feature of the manufacturing process information and wherein the illustration options are applicable to the workpiece image data, in order to cause an illustration of the respective workpiece image data on the display unit, wherein the illustration is specifically set for a manufacturing feature. The display unit is, for example, a monitor of the flatbed machine tool, a display of a mobile unit of a localization system, or a control monitor that is also provided, for example, for outputting an image of the workpiece to be cut taken by a machine interior camera.

In some embodiments of the method, the workpiece image data is read from a manufacturing plan stored in the manufacturing control system on which the manufacturing of the workpieces is based. The workpiece image data can be displayed as a graphic representing the cut material, in which the manufacturing features are visually highlighted to an operator. The workpiece image data can be part of an image of the cut material taken by a machine interior camera, and taking into account an illustration option can result in an overlay of image data associated with a manufacturing feature onto the image of the cut material.

In some embodiments of the method, a manufacturing feature can be represented using—as an illustration option—a color spectrum of the workpiece image data or a workpiece boundary line. In particular, a manufacturing feature can relate to the cutting quality of a laser cutting process of the starting material along a contour line. For example, a manufacturing feature, particularly a manufacturing feature related to a separation contour, can be a collision between a processing head of the flatbed machine tool and the starting material to be processed or a separated workpiece, a cut stop during the cutting process, a re-entry into a cutting process, an anomaly of the cutting process such as a long incision process, a nozzle clearance to the plate-shaped starting material outside a specified range, a contamination of a protective glass, or a plasma sensor signal of the cutting process.

In some embodiments of the method, a manufacturing feature can be associated with a specific position on the plate-shaped output cut material or a manufacturing feature can relate to the separation contour. For example, a manufacturing feature can be obtained from a sensor signal of a manufacturing monitoring system, in particular of a cutting sensor system, in order to provide information relevant to the process quality and cutting quality, in particular information of high-quality, to the manufacturing control system in a separation contour-related manner.

In general, the illustration options can include graphical visualizations, which in particular can be based on color coding and/or symbols.

In some embodiments, the method can further include forming a category of workpieces depending on a picking strategy, on which the sorting process is based, taking into account a subsequent process step, a customer, an order, or an assembly. Workpieces of a same category can be displayed in a uniform manner with respect to color or can be marked with a demarcation line, which surrounds the workpieces of a same category.

The concepts disclosed herein have the advantage, for example, that information can be displayed to a machine operator in such a way that a separation process and/or sorting process can be made more efficient. The displaying of manufacturing features can also facilitate and improve the quality control.

Aspects disclosed herein are based in part on the realization that, after a cutting process on laser flatbed machines, information about the previous cutting process can be provided to a machine operator during workpiece separation. This is possible because machine tools gather a plurality of processing parameters from which, for example, indications for workpiece quality can be obtained. This information can now be visualized to the machine operator in a workpiece-related or contour-related manner.

According to the concepts disclosed herein, cut workpieces can be graphically visualized in a graphic of the sheet layout depending on process features and influences. For example, colors and symbols can be used for this purpose. For example, information about a collision between a laser processing nozzle and sheet metal can be communicated to a machine operator not only with a time stamp, but it can also be recorded in a manufacturing-specific manner and transmitted in a workpiece-specific manner, in particular by communicating which workpiece is affected and, for example, where on the contour of the workpiece the collision occurred. Any reduction in quality resulting therefrom can thus be localized and evaluated quickly and precisely.

In flatbed machine tools, a machine operator can be notified when a laser processing nozzle (from which the laser cutting beam emerges and which is moved over the sheet metal along cutting contours) collides or would collide with the processed sheet metal, usually a tilted cut-out workpiece. According to the concepts disclosed herein, the machine operator can now be enabled to locate precisely and inspect a reduction in the quality of the workpiece caused by the collision promptly and particularly quickly, in particular in less than 1 s.

According to the concepts disclosed herein, it is possible to display information on the manufacturing process in a timely manner and in connection with a produced workpiece, wherein the presentation of, for example, image content takes into account the physical conditions of human perception and reception of information. In particular, the illustration of information aims at making it possible for the machine operator to perceive the displayed information in a certain way and, moreover, shape the perception functionally.

FIG. 1 schematically shows a manufacturing system 1 including a flatbed machine tool 3 and a manufacturing control system 5.

To illustrate the environment of the industrial processing of workpieces addressed herein, FIG. 1 shows a sorting process as it can be carried out in connection with the flatbed machine tool 3, which can be configured, for example, as a laser cutting machine. According to a manufacturing plan 5A, which is provided in the manufacturing control system 5, workpieces 23A, 23A1, 23A2, 23A3, . . . 23D (also referred to herein as cut material 10) are cut and provided for sorting to an operator 31 of the flatbed machine tool 3 on a sorting table 9, for example. In this case, the workpieces 23A, 23A1, 23A2, 23A3, . . . 23D are arranged side by side on a pallet 9A, which is loaded with the starting material and brought into the laser cutting machine for the cutting process. After the cutting process, the workpieces are output, for example, while maintaining an original sheet form, wherein the sheet form is due to the flat material fed to the laser cutting machine. In the case of a laser cutting machine, the workpieces 23A, 23A1, 23A2, 23A3, . . . 23D have been separated from the residual material 34 (dashed area) of the flat material by laser cutting. However, the workpieces are still given in the sheet form, which is shaped by the residual material 34. In FIG. 1, the sorting process takes place directly from the pallet 9A of the flatbed machine tool 3. Alternatively, the sorting can take place, for example, from a conveyor belt adjoining the flatbed machine tool 3.

Generally, the manufacturing control system 5 can be configured to be connected to one or more flatbed machine tools positioned in a manufacturing hall via wireless or wired communication links. In general, the manufacturing control system 5 can serve to control process sequences/manufacturing steps in the industrial manufacturing of workpieces using a machine tool. For this purpose, the manufacturing control system 5 can receive information about the process sequences/manufacturing steps as well as status information of the machine tool. The manufacturing control system 5 can be implemented in a data processing device. This can be a single electronic data processing device (server) or a network of several data processing devices (server network/cloud). The data processing device or the network can be provided locally in the manufacturing plant or can be set up externally in a decentral manner.

For example, the flatbed machine tool 3 transfers manufacturing process information 3A to the manufacturing control system 5. For this purpose, a process data signal connection s_p is available, for example.

FIG. 1 further illustrates schematically that the manufacturing plan 5A is stored digitally in the manufacturing control system 5. The manufacturing plan 5A stores, for example, order information for the industrial processing of manufacturing-plan-specific workpieces. Manufacturing plans generally include order information that is given, for example, for workpiece data 23A', . . . 23D' in the form of geometry data set of the manufacturing plan-specific workpieces and/or in the form of a separation plan. The separation plan specifies how the workpieces are cut out of the starting sheet with, for example, a laser beam. Furthermore, the manufacturing plan 5A can include one or more processing parameters and workpiece parameters of the manufacturing plan-specific workpieces.

For a cutting process, the manufacturing control system 5 transfers, for example, manufacturing instructions of the manufacturing plan 5A (in particular the separation plan) to the flatbed machine tool 3; for this purpose, a manufacturing data signal connection s_f is indicated exemplarily in FIG. 1.

FIG. 1 also schematically shows a camera 11 (machine interior camera) for image acquisition of the sorting process. The camera 11 can be used, for example, to monitor which sheet has been placed and how many workpieces or which workpieces of a cut sheet have already been sorted. Several cameras can also be provided. To detect a cut sheet, for example, a cut pattern or a code (see also FIG. 2) can be captured. The camera 11 transmits image data to the manufacturing control system 5, for example via a camera image data signal connection s_k.

The manufacturing control system 5 is configured to provide visual support to the operator 31 via displays. For example, the manufacturing control system 5 generally transmits image data, which can, for example, also include the image data of the camera, to a display unit 17. The display unit 17 is, for example, connected to the manufacturing control system 5 via an image data signal connection s_a2. The display unit 17 is, for example, a control monitor on which an image 21 of the camera 11 and order information 19 (for example in text form) are displayed. In general, displays in the manufacturing system can show, in addition to manufacturing-specific aspects, information about the order in a manner that is readable by humans and/or machines, is coded and/or is in written form and/or is a figure.

As an example, FIG. 1 further indicates a localization system with positioning units 13. The positioning units 13 are connected to the manufacturing control system 5 via localization data signal connection s_1. The positioning units 13 are configured to detect in a positioning area 13A, for example, movements of a hand of the operator 31 during sorting or the current positions of mobile units of the localization system. In FIG. 1, a mobile unit 16A has been placed on a transport carriage 33 as an example. In particular, those workpieces are placed on the transport carriage 33, which are to be tracked by the mobile unit 16A for a specific order (here workpieces 23A_2) in subsequent manufacturing steps. For this purpose, position data can be provided to the manufacturing control system 5 via the localization data signal connection s_1.

The mobile unit 16A has a display unit 16. Via an image data signal connection s_a3, information can be sent from the manufacturing control system 5 to the mobile unit 16A and output on the display unit 16.

Alternatively or additionally, a monitor of the flatbed machine tool 3 (display unit 15 in FIG. 1) can be provided. The data displayed need not always completely represent the entire information content of a workpiece or manufacturing process. Rather, the displays can show context-based data necessary for the corresponding manufacturing process, for example, the next manufacturing process for logistics, workpiece geometry for picking, workpiece tolerances for quality inspection. Illustration parameters such as size, color, movement, and flashing represent suitable means for emphasizing and supporting currently important information.

In particular, the manufacturing control system 5 is configured to use such illustration options to make the workpiece-specific manufacturing process information 3A accessible to the machine operator 31. As an example, illustration options 15A are stored in FIG. 1 in the manufacturing control system 5 and can be output together with the production process information 3A and the workpiece data 23A', . . . 23D' via the image data signal connections s_a1, . . . to the display units 15, 16, 17.

FIG. 2 shows a view of monitor image data 7 output on the display unit 15; the view illustrates various aspects of making recognizable manufacturing process information for individual cut workpieces. The monitor outputs can be used by the operator 31 to consider the manufacturing process information when sorting. In particular, the monitor outputs can facilitate workpiece quality inspection as one illustrates information on manufacturing process to the operator, wherein the manufacturing process information can, among other things, influence the quality of the manufacture of a workpiece.

FIG. 2 shows an example of the top view of the cut material 10 in FIG. 1 taken with the camera 11. The cut material 10 includes, as an example, four groups of differently shaped workpieces 23A, . . . 23D, which are arranged on the support element (the pallet 9A in FIG. 1). Boundary lines enclosing the workpiece group 24A, . . . 24D are indicated for clarity. The cut material 10 has been placed at a known position in space using the correspondingly displaceable pallet 9A. It is pointed out that the operator can often hardly distinguish the workpieces 23A, . . . 23D and the residual material 34 from each other in their appearance. This is particularly the case when very fine laser cutting lines are used. In this respect, the representation in FIG. 2 deviates in its clarity from the real recognizability of cut workpieces. A large monitor has the advantage that the entire sheet metal panel with all cut parts can be displayed and the parts of a workpiece group distributed over the sheet can be highlighted, e.g., by color coding. By the unique visualization of the association, even small workpieces can be reliably identified, e.g., on the pallet 9A.

In some embodiments, the flat material can be provided with a machine-readable code (e.g., Data Matrix Code: DMC). The machine-readable code can always be provided at a predetermined location for reproducible positioning of the cut material. An image 45 of the code, in particular a digital image, can be displayed on the monitor display.

Furthermore, the code can be used to automatically identify in the manufacturing control system 5 the separation plan with which the cut material was generated. From the known position of the cut material and the cutting plan, the positions of the workpieces can be derived in the manufacturing control system 5. For example, the shapes of the workpieces can be highlighted in the camera image. For example, different workpieces with workpiece data sets 23A', . . . 23D' can be displayed with different colors, or the boundaries of the workpieces can be distinguishably displayed and emphasized. Other output options or marking options such as flashing, flickering, fluttering, wiggling, rotating, etc. can also be implemented. In addition, positions of microjoints and workpiece markings can also be shown.

The known positions of the workpieces can further be used to make workpiece-specific manufacturing process information 3A visible; i.e., to display workpiece-specific manufacturing process information 3A to the operator 31. In other words, in the graphical illustration of a workpiece, for example, additional information from the process monitoring of the manufacturing process can be visualized punctually or in the form of a contour section.

This can be done in the context of a method for visualizing manufacturing process information 3A during manufacturing of workpieces 23A, . . . with a flatbed machine tool 3, wherein the following steps are performed:

Workpiece image data 23A', . . . are provided in the manufacturing control system 5. The workpiece image data 23A' can be based on image acquisition with a camera (e.g. camera 11) or on image data stored in the manufacturing plan 5A. The workpiece image data 23A', . . . can be read, for example, from the manufacturing plan 5A stored in the manufacturing control system 5 on which the manufacturing of the workpieces 23A, . . . was/is based. The workpiece image data 23A', . . . are assigned to at least one of the workpieces 23A, . . . of the cut material 10 and workpiece image data 23A', . . . can be displayed on a display unit, e.g., one of the display units 15, 16, 17.

Furthermore, workpiece-specific manufacturing process information 3A is provided in the manufacturing control system 5. The manufacturing process information 3A was acquired in a workpiece-specific manner during the manufacturing of the workpieces 23A, . . . in the flatbed machine tool 3 and includes manufacturing features of the separation process performed in the flatbed machine tool 3. A manufacturing feature can be associated with a specific position on the plate-shaped output cut material 10 or can be separation contour related. Manufacturing features can be obtained from a sensor signal of a manufacturing monitoring system, in particular a cutting sensor system, in order to provide information relevant to the process quality and cutting quality, in particular information of high-quality, to the manufacturing control system 5 in relation to a separation contour.

Furthermore, a database with illustration options 15A is provided in the manufacturing control system 5, wherein the illustration options 15A are each associated with a specific manufacturing feature of the manufacturing process information 3A. The illustration options 15A can be applied to the workpiece image data 23A', . . . in such a way, that an illustration of workpiece image data 23A', . . . , which is specifically set for a manufacturing feature, is caused on the display unit 15. For example, a manufacturing feature can be represented by a color spectrum of the workpiece image data 23A', . . . or a workpiece boundary line 41 as an illustration option, or a manufacturing feature can include a specific symbol. Manufacturing features can particularly relate to the cutting quality of a laser cutting process of the starting material along a contour line.

According to the method, the workpiece image data 23A', . . . of the at least one of the workpieces 23A, . . . of the cut material 10 are displayed on the display unit with workpiece-specific consideration of the illustration options 15A. For example, the workpiece image data 23A', . . . can be displayed as a graphic representing the cut material 10, in which the manufacturing features are visually highlighted for an operator 31. For example, if the workpiece image data 23A', . . . is based on a part of an image of the cut material 10 taken by a machine interior camera 11, the consideration of one of the illustration options 15A can result in an overlay of image data associated with a manufacturing feature on the image of the cut material 10.

For example, the following additional information can be visualized for the operator 31 using the manufacturing process information:

The cutting quality or other relevant parameters can be displayed for the operator by a color spectrum.

Workpieces that have been subjected to collisions with the processing head can be highlighted to trigger a separate quality control. This also applies to workpieces, where in the manufacturing has occurred, for example, a cut stop, a re-entry, an anomaly such as an incision process that takes too long or an unusual nozzle distance, contamination of a protective glass (stray light, focal shift), and/or plasma sensor signals.

In addition to a static visualization on the sheet, the information can be displayed separately and even more clearly, if a removal of the workpiece is detected, e.g., with the localization system.

In some embodiments, the information can be overlayed with a live image from the machine interior camera or the information can be displayed on a live image at the output of the machine, such as at a pallet changer.

Furthermore, the manufacturing process information can be integrated into a live image of the manufacturing process or transferred to the view of the sheet only after completion of a cutting process.

In the form of a schematized flowchart, FIG. 3 shows an exemplary method 49 for visualizing manufacturing process information during manufacturing of workpieces, the method being subdivided into the following steps.

In a step 51, manufactured workpieces 23A, 23A1, . . . are provided on the sorting table 9. For example, the workpieces 23A . . . can be determined that are positioned for sorting at the sorting point, i.e., that are accessible to the operator 31 from the sorting table 9. Information about badly cut or already dropped workpieces 23A . . . can be taken into account.

In a step 53, the workpiece-specific manufacturing process information 3A is provided in the manufacturing control system 5, wherein the manufacturing process information 3A was acquired in a workpiece-specific manner during the manufacturing of the workpieces 23A, . . . in the flatbed machine tool 3 and includes manufacturing features of the separation process performed in the flatbed machine tool 3 during the manufacturing of the workpieces 23A, . . . .

In a step 55, the workpiece image data 23A', . . . can be read from a manufacturing plan 5A 5, on which the production of workpieces 23A, . . . is based and which is stored in the manufacturing control system. The workpiece image data 23A', . . . can be displayed as a graphic representing the cut material (10), in which the manufacturing features are visually highlighted for an operator (31). Alternatively or additionally, the workpiece image data 23A', . . . can be part of an image of the cut material 10 taken by a camera 11. In particular, the consideration of a illustration option 15A can result in an overlay of image data associated with a manufacturing feature on the image of the cut material 10.

In a step 57, a database of illustration options 15A is provided in the manufacturing control system 5, wherein the illustration options 15A are each associated with a specific manufacturing feature of the manufacturing process information 3A and wherein the illustration options 15A are applicable to the workpiece image data 23A', . . . to cause an illustration of workpiece image data 23A', . . . on a display unit 15, which is specifically set for a manufacturing feature.

In a step 59, the workpiece image data 23A', . . . of the at least one of the workpieces 23A, . . . of the cut material 10 can be displayed on the display unit 15, 16, 17 with workpiece-specific consideration of the illustration options 15A.

In a step 59A, a manufacturing feature can be illustrated with a color spectrum (R, G, B) as an illustration option, wherein the color spectrum (R, G, B) is implemented in the workpiece image data 23A', . . . or in a workpiece boundary line (41) as a color coding.

In a step 59B, a manufacturing feature can additionally or alternatively be represented by a workpiece boundary line 41 implemented with color coding.

In this regard, in both steps 59A and 59B, a manufacturing feature can relate to the cutting quality of a laser cutting process of the starting material along a contour line.

The illustration can be accompanied by, for example, a visualization of the above with a simulation that can be displayed together with a numerical control (NC) on a graphical user interface or on a user interface that enables communication between man and machine (HMI), depending on the picking strategy (subsequent process step, customer, order, assembly, etc.), a uniform color coding of workpieces of the same category and a display of samples for a quality control and of information on measuring points and features.

Based on the concepts disclosed herein, among other things, sensor signals, which are available for various aspects of the manufacturing process, can be provided to the operator so that information about the manufacturing process can be displayed in association with a generated workpiece, wherein the presentation of, for example, image content is done in a manner that takes into account the physical conditions of human perception and reception of information. In particular, the manufacturing information within the illustration can aim at making it possible for the machine operator to perceive the displayed information in a certain way and at make the perception expedient for working steps. Furthermore, by integrating a cutting sensor system in a processing head, for example, information relevant to the process quality and cutting quality, in particular, high quality information, can be made available in a contour-related manner, which can be used in quality inspection.

Exemplary implementations of the illustration of manufacturing process information are shown schematically in FIG. 2. For the shown cut material 10, one can see a representation of the sheet edge 35 and four demarcation lines 24A, . . . 24D. The four demarcation lines 24A, . . . 24D separate each graphic representation of workpiece data 23A', . . . 23D' from each other. Further, it can be seen that the workpiece 23A1 has already been sorted, i.e., workpiece data 23A'1 is no longer displayed. Furthermore, an image 45 for the code of the processed material sheet is displayed.

The following examples of the combination of illustration options and manufacturing process information are schematically indicated in FIG. 2: For an illustration of workpiece data 23A2', a cutting contour is shown dashed in an area as a symbol 39 for a cut stop. For an illustration of workpiece data 23B', color coding with red R, green G, and blue B (shown in FIG. 2 with dot densities) is provided along a cutting contour 41 as a symbol indicating a distance error in the cutting process. For an illustration of workpiece data 23C', highlighting of an area 41A, in which an incision process duration does not correspond to the standard duration, is provided along a cutting contour. Further, the entire workpiece can be marked with a warning color or a special hatching 43. As another example for a display of manufacturing process information, a temperature symbol 37 is superimposed on the illustration of workpiece data 23D'.

It is noted that, in addition, categories of workpieces 23A, . . . can be formed depending on a picking strategy, on which the sorting process is based, taking into account a subsequent process step, a customer, an order, or an assembly, and, for example, workpieces 23A, . . . of the same category can be displayed in a uniform manner with respect to color or can be marked with a demarcation line 24A, which surrounds the workpieces 23A, . . . of the same category.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for visualizing manufacturing process information during manufacturing of workpieces with a flatbed machine tool, wherein the workpieces are output as cut material on a pallet of the flatbed machine tool, a sorting table, or a conveyor belt, and wherein the cut material is given in a plate-shaped arrangement according to a plate-shaped starting material, the method comprising:
providing workpiece image data in a manufacturing control system, wherein the workpiece image data is associated with at least one of the workpieces of the cut material and is configured to be displayed on a display unit,
providing workpiece-specific manufacturing process information in the manufacturing control system, wherein the workpiece-specific manufacturing process information is acquired in a workpiece-specific manner during the manufacturing of the workpieces in the flatbed machine tool and the workpiece-specific manufacturing process information comprises manufacturing features of cutting processes, which are carried out in the flatbed machine tool during manufacturing of the workpieces,
providing a database of illustration options in the manufacturing control system, wherein the illustration options each are associated with a specific manufacturing feature, of the manufacturing features, of the workpiece-specific manufacturing process information and the illustration options are applicable to the workpiece image data to cause an illustration of the respective workpiece image data on the display unit, the illustration being set specifically for the respective manufacturing feature, and
displaying the workpiece image data of the at least one of the workpieces of the cut material on the display unit, while taking into account the illustration options in the workpiece-specific manner, wherein at least one manufacturing feature relates to cutting quality of a laser cutting process of the plate-shaped starting material along a contour line separating the workpiece from a residual material, and the workpiece image data is displayed as a graphic representing the cut material, in which the cutting quality along the contour line separating the workpiece from the residual material is visually highlighted to an operator.

2. The method according to claim 1, wherein the workpiece image data is read from a manufacturing plan stored in the manufacturing control system, on which the manufacturing of the workpieces is based.

3. The method according to claim 1, wherein the workpiece image data is part of an image of the cut material taken by a camera and the taking into account of an illustration option, of the illustration options, results in an overlay of image data associated with the manufacturing feature on the image of the cut material.

4. The method according to claim 1, the method further comprising:
illustrating the manufacturing feature with a color spectrum as an illustration option of the illustration options, wherein the color spectrum is implemented in the workpiece image data or in a workpiece boundary line as color coding.

5. The method according to claim 1, wherein the manufacturing feature is related to a separation contour and is one of:
a collision between a processing head of the flatbed machine tool and the plate-shaped starting material to be processed or a separated workpiece,
a cut stop during one of the cutting processes,
a re-entry into one of the cutting processes,
an anomaly such as a long incision process during one of the cutting processes,
a nozzle clearance outside a specified range,
a contamination of a protective glass, or
a plasma sensor signal of one of the cutting processes.

6. The method according to claim 5, wherein the nozzle clearance is with respect to a flat material.

7. The method according to claim 1, wherein the manufacturing feature is associated with a specific position on the plate-shaped output cut material or relates to a separation contour, or
the method further comprising obtaining the manufacturing feature from a sensor signal of a manufacturing monitoring system in order to provide information relevant to process quality and cutting quality to the manufacturing control system in relation to a separation contour.

8. The method according to claim 7, wherein the manufacturing monitoring system is a cutting sensor system of the flatbed machine tool.

9. The method according to claim 1, wherein the illustration options comprise graphical visualizations, which are based on color coding or on symbols.

10. The method according to claim 1, further comprising
forming a category of workpieces depending on a picking strategy, on which the sorting process is based, taking into account a subsequent process step, a customer, an order, or an assembly, and
illustrating the workpieces of a same category in a uniform manner with respect to color or marking the workpieces of the same category with a demarcation line, which surrounds the workpieces of the same category.

11. A manufacturing system for manufacturing the workpieces, the manufacturing system comprising:
the flat-bed machine tool configured to output the workpieces as the cut material on the pallet of the flat-bed machine tool, the sorting table, or the conveyor belt, wherein the cut material is given in a plate-shaped arrangement according to the plate-shaped starting material,
the manufacturing control system configured to perform the method for visualizing the manufacturing process information during the manufacturing of the workpieces with the flatbed machine tool according to claim 1, and
the display unit for displaying the workpiece image data associated with at least one of the workpieces of the cut material, taking into account the illustration options in the workpiece-specific manner,
wherein the illustration options are respectively associated with the respective specific manufacturing feature of the manufacturing process information, and
wherein the illustration options are applicable to the workpiece image data, in order to cause an illustration of the respective workpiece image data on the display unit, wherein the illustration is set for the respective manufacturing feature.

12. The manufacturing system according to claim 11, wherein the display unit is a monitor of the flatbed machine tool, a display of a mobile unit, or a control monitor for outputting an image of the cut material taken by a camera.

13. The method according to claim 1, wherein the workpieces are sheet metal workpieces.

* * * * *